(12) United States Patent
Borgerding

(10) Patent No.: US 7,882,663 B2
(45) Date of Patent: Feb. 8, 2011

(54) WATER RUNOFF DEFLECTOR FOR A VEHICLE AT A LOADING DOCK

(75) Inventor: Gary Borgerding, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 11/713,187

(22) Filed: Mar. 2, 2007

(65) Prior Publication Data

US 2007/0175116 A1    Aug. 2, 2007

Related U.S. Application Data

(63) Continuation of application No. 10/748,884, filed on Dec. 30, 2003, now Pat. No. 7,185,463.

(51) Int. Cl.
*E04H 14/00* (2006.01)
(52) U.S. Cl. ...................... 52/173.2; 160/184
(58) Field of Classification Search ................. 52/2.12, 52/173.2, 174; 160/89, 184
See application file for complete search history.

(56) References Cited

U.S. PATENT DOCUMENTS

| | | |
|---|---|---|
| 615,174 A | 11/1898 | Hettrick |
| 1,587,134 A | 6/1926 | Anton |
| 2,576,692 A | 11/1951 | NeSmith |
| 2,764,236 A | 9/1956 | Dye |
| 2,898,983 A | 8/1959 | Etten |
| 3,230,675 A | 1/1966 | Frommelt et al. |
| 3,299,570 A | 1/1967 | Radcliffe |
| 3,322,132 A * | 5/1967 | Rieder et al. ................ 135/123 |
| 3,352,314 A | 11/1967 | Frommelt et al. |

(Continued)

FOREIGN PATENT DOCUMENTS

DE    2239483    2/1974

(Continued)

OTHER PUBLICATIONS

Blueprint No. D802-0176; *Rain Diverter Curtain*; Rite-Hite Model No. WG402, dated Jul. 1, 1992.

(Continued)

*Primary Examiner*—Richard E Chilcot, Jr.
*Assistant Examiner*—William V Gilbert
(74) *Attorney, Agent, or Firm*—Hanley, Flight & Zimmerman, LLC

(57) ABSTRACT

A water runoff deflector for use at a loading dock includes a seal suspended from a wall-mounted frame. A truck can back underneath the deflector so that the seal rests atop the truck's roof. The seal helps prevent water (snow, rain, ice, slush, etc.) on the truck's roof from flowing off the back end of the truck and spilling into the building. The seal helps block any water flowing along the truck's roof toward the doorway of the dock and redirects the flow off to either side of the truck. The deflector can be used in conjunction with or without a conventional dock seal or dock shelter. Unique front and rear bumper designs along with a pivotally yieldable frame make the runoff deflector particularly useful in adapting to trucks of various heights. In some cases, the front bumper includes multiple panels of different rigidity to ensure smooth truck departures.

14 Claims, 9 Drawing Sheets

U.S. PATENT DOCUMENTS

| | | | |
|---|---|---|---|
| 3,375,625 A | 4/1968 | Edkins et al. | |
| 3,538,655 A | 11/1970 | Frommelt et al. | |
| 3,613,324 A | 10/1971 | Conger | |
| 3,653,173 A | 4/1972 | Frommelt et al. | |
| 3,665,997 A | 5/1972 | Smith et al. | |
| 3,683,572 A | 8/1972 | Alten | |
| 3,714,745 A | 2/1973 | O'Neal | |
| 3,772,839 A | 11/1973 | Timbers | |
| 3,826,049 A | 7/1974 | Frommelt et al. | |
| 3,834,400 A | 9/1974 | Sattler | |
| 3,854,257 A | 12/1974 | Lobel | |
| 3,875,954 A | 4/1975 | Frommelt et al. | |
| 3,915,183 A | 10/1975 | Frommelt | |
| 3,934,380 A | 1/1976 | Frommelt et al. | |
| 3,935,684 A | 2/1976 | Frommelt et al. | |
| 3,939,614 A | 2/1976 | Frommelt et al. | |
| 3,994,103 A | 11/1976 | Ouellet | |
| 4,015,380 A | 4/1977 | Chalfant | |
| 4,062,157 A | 12/1977 | Potthoff | |
| 4,112,958 A | 9/1978 | Anderberg | |
| 4,389,821 A * | 6/1983 | O'Neal | 52/2.13 |
| 4,554,768 A | 11/1985 | Srajer | |
| 4,571,903 A | 2/1986 | Strassner | |
| 4,601,142 A | 7/1986 | Frommelt | |
| 4,711,059 A | 12/1987 | Layne | |
| 4,724,648 A | 2/1988 | Diepholder | |
| 4,799,341 A | 1/1989 | Frommelt et al. | |
| 4,855,567 A | 8/1989 | Mueller | |
| 4,873,801 A | 10/1989 | Winters | |
| 5,007,211 A | 4/1991 | Oullet | |
| 5,125,196 A | 6/1992 | Moody | |
| 5,174,075 A | 12/1992 | Alten | |
| 5,185,977 A | 2/1993 | Brockman et al. | |
| 5,195,285 A * | 3/1993 | Alten | 52/173.2 |
| 5,282,342 A | 2/1994 | Brockman et al. | |
| 5,553,424 A | 9/1996 | Brockman et al. | |
| 5,608,996 A | 3/1997 | Brockman et al. | |
| 5,622,016 A | 4/1997 | Frommelt et al. | |
| 5,675,945 A | 10/1997 | Giuliani et al. | |
| 5,775,044 A | 7/1998 | Styba et al. | |
| 5,794,678 A | 8/1998 | Beringer et al. | |
| 5,927,025 A | 7/1999 | Brockman et al. | |
| 5,953,868 A | 9/1999 | Giuliani et al. | |
| 5,996,291 A | 12/1999 | Styba et al. | |
| 6,123,136 A | 9/2000 | Williams | |
| 6,205,721 B1 * | 3/2001 | Ashelin et al. | 52/173.2 |
| 6,233,885 B1 | 5/2001 | Hoffmann et al. | |
| 6,279,641 B1 | 8/2001 | Malott | |
| 6,374,554 B1 | 4/2002 | Eungard | |
| 6,425,214 B1 | 7/2002 | Boffeli et al. | |
| 6,550,191 B2 | 4/2003 | Hoffmann | |
| 7,185,463 B2 | 3/2007 | Borgerding | |
| 2001/0004814 A1 | 6/2001 | Hoffmann | |
| 2001/0018813 A1 * | 9/2001 | Ashelin et al. | 52/173.2 |
| 2003/0140579 A1 * | 7/2003 | Hoffmann et al. | 52/173.2 |

FOREIGN PATENT DOCUMENTS

| | | |
|---|---|---|
| DE | 2436518 | 8/1975 |
| DE | 4128168 | 3/1993 |
| DE | 4317054 | 11/1994 |
| EP | 0186093 | 7/1986 |
| EP | 0493713 | 7/1992 |
| GB | 1509935 | 5/1978 |
| GB | 2312915 | 11/1997 |
| WO | 9943583 | 9/1999 |

OTHER PUBLICATIONS

Blueprint Nos. 692-0125 and 692-0126; *VHL Bottom Pads and VHL Bottom Pads Detail*; Frommelt Industries, Inc. dated Oct. 7, 1988.

Drawing No. A 204-0029 for "C-Curtain—Split Corners", RiteHite Model C-Curtain, dated May 27, 1994.

"*Loading Dock Seal*" Brochure, Kinnear—Division of Harsco Corp., 4 pages (1978).

"*Dock Seal*", Installation Instructions, Kinnear—Division of Harsco Corp., 4 pages (1978).

"*Super Seal Dock Seals*" catalog 11160/SU; Super Seal Mfg. Ltd.; no date listed, but stamped rec'd by USPTO on Aug. 29, 1989.

*Partial European Search Report* corresponding to European patent application No. EP 04030971, Apr. 7, 2005, 3 pages.

*Annex to the European Search Report* on European patent application No. EP 04030971. Apr. 7, 2005, 2 pages.

*European Search Report* corresponding to European application No. EP 04030971, Jul. 8, 2005, 5 pages.

*Annex to the European Search Report* on European application No. EP 04030971, Jul. 8, 2005, 1 page.

United States Patent and Trademark Office, "Notice of Allowance," issued in connection with U.S. Appl. No. 10/748,884, on Dec. 20, 2006 (8 pages).

United States Patent and Trademark Office, "Non-Final Office Action," issued in connection with U.S. Appl. No. 10/748,884, on Jul. 11, 2006 (11 pages).

United States Patent and Trademark Office, "Non-Final Office Action," issued in connection with U.S. Appl. No. 10/748,884, on Apr. 21, 2006 (5 pages).

European Patent Office, "Communication," issued in connection with European Patent Application Serial No. 04030971.8, on Jul. 27, 2005 (1 page).

European Patent Office, "Communication Pursuant to Rule 50 EPC," issued in connection with European Patent Application Serial No. 04030971.8, on Sep. 19, 2005 (2 pages).

European Patent Office, "Communication Pursuant to Article 96(2) EPC," issued in connection with European Patent Application Serial No. 04030971.8, on Apr. 16, 2007 (5 pages).

European Patent Office, "Communication Pursuant to Article 94(3) EPC," issued in connection with European Patent Application Serial No. 04030971.8, on Jul. 21, 2008 (4 pages).

Australian Intellectual Property Office, "Direction to Request Examination," issued in connection with Australian Patent Application Serial No. 2004242521, on Apr. 1, 2008 (1 page).

Australian Intellectual Property Office, "Examiner's First Report," issued in connection with Australian Patent Application Serial No. 2004242521, on Jul. 10, 2009 (1 page).

Canadian Intellectual Property Office, "Office Action," issued in connection with Canadian Patent Application Serial No. 2,491,199, on Jan. 29, 2007 (3 pages).

Canadian Intellectual Property Office, "Notice of Allowance," issued in connection with Canadian application serial No. 2,491,199, issued Jan. 24, 2008, 1 page.

European Patent Office, "Office Action," issued in connection with European application serial No. 04 030 971.8, issued Aug. 10, 2009, 2 pages.

Australian Patent Office, "Notice of Acceptance," issued in connection with Australian application serial No. 2004242521, issued Mar. 23, 2010, 9 pages.

\* cited by examiner

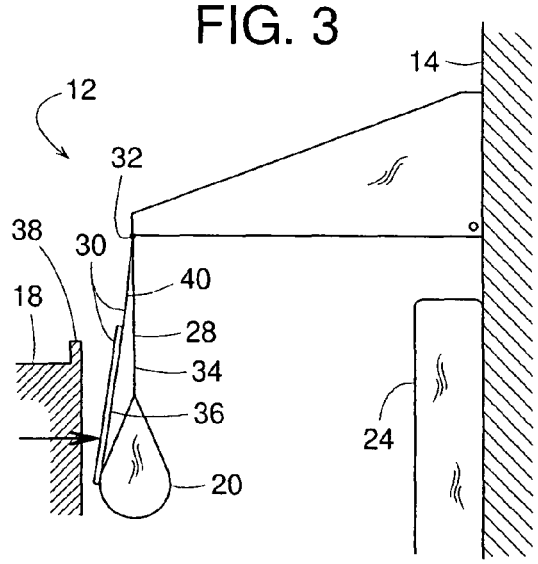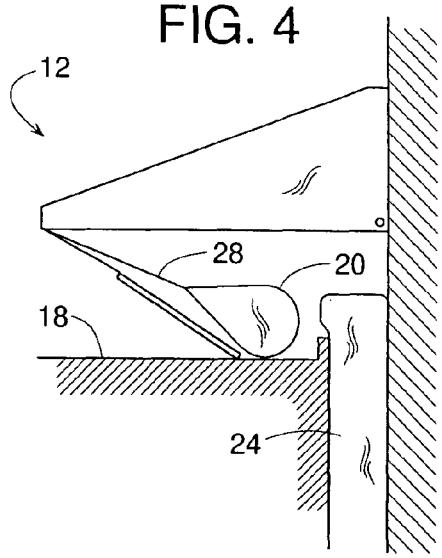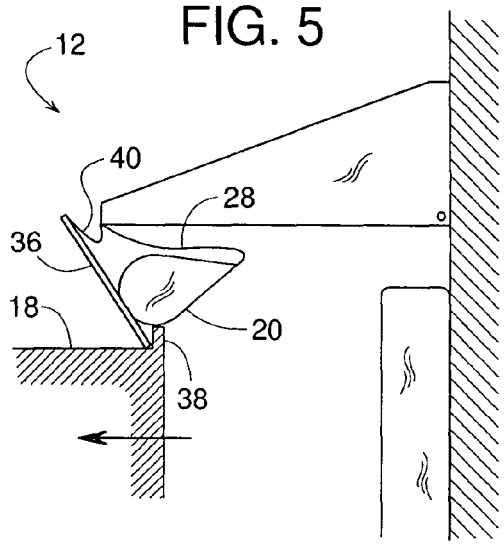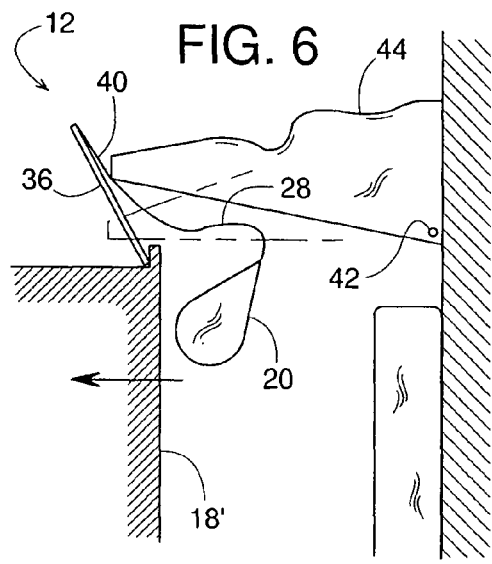

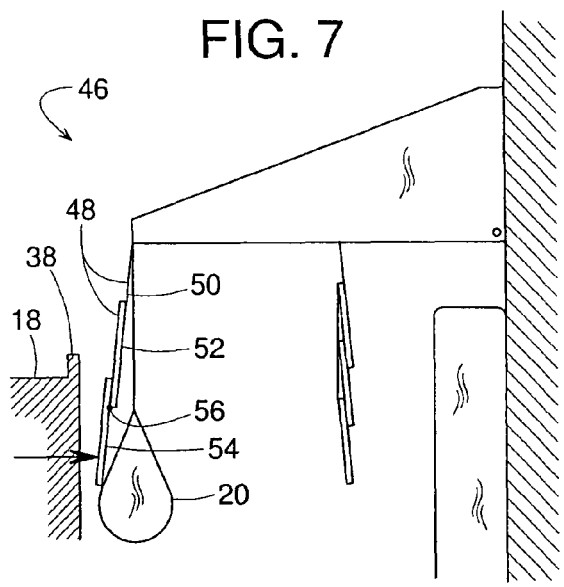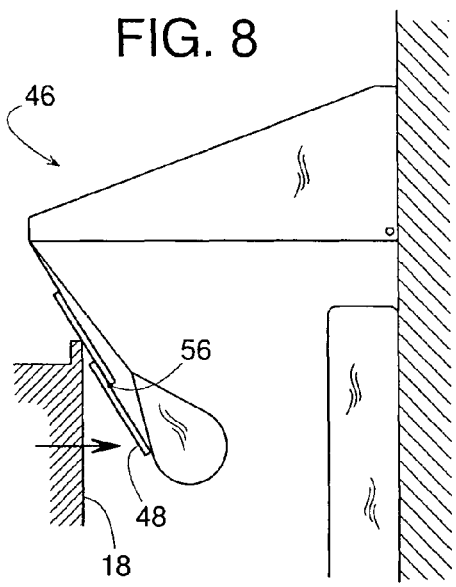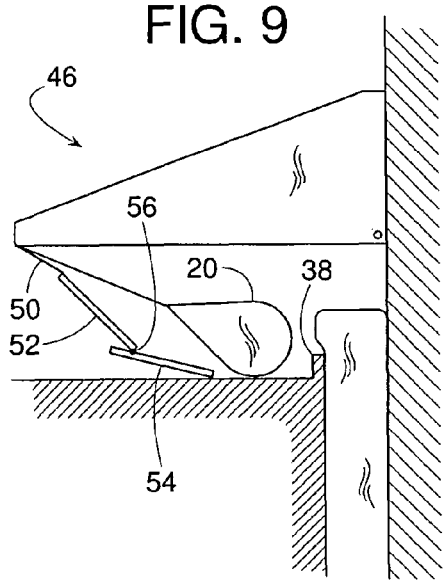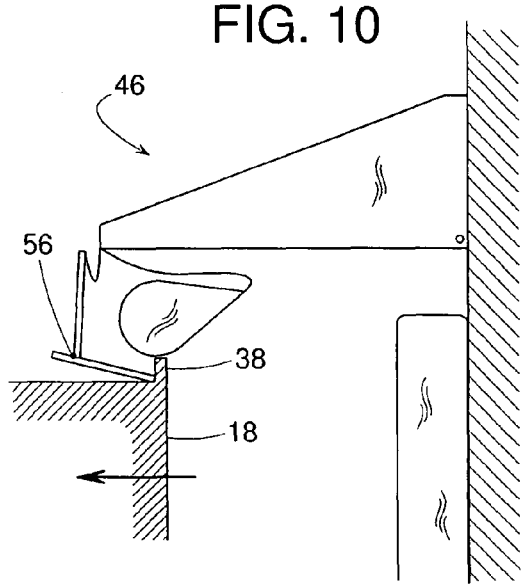

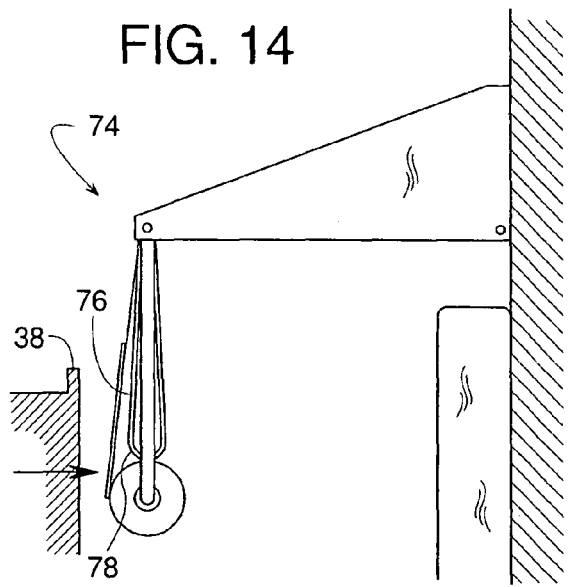
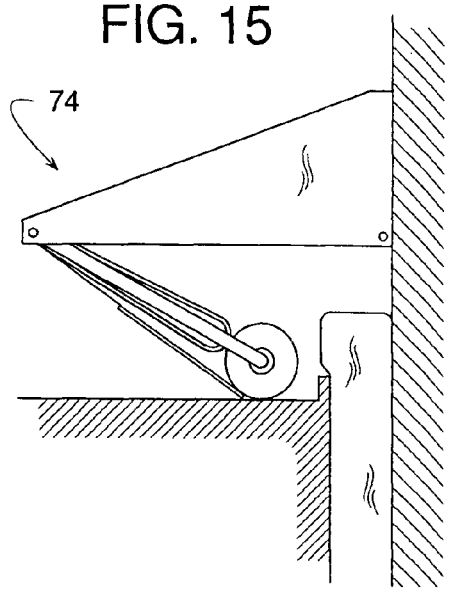
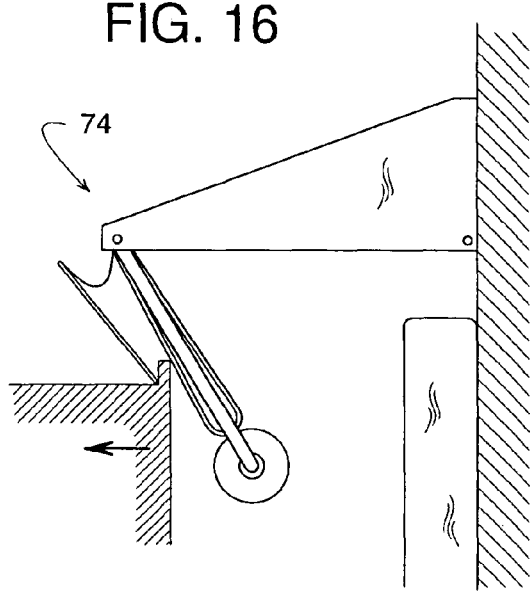

WATER RUNOFF DEFLECTOR FOR A VEHICLE AT A LOADING DOCK

CROSS REFERENCE TO RELATED APPLICATION

This application is a continuation of U.S. patent application Ser. No. 10/748,884 entitled "Water Runoff Deflector for a Vehicle at a Loading Dock," filed Dec. 30, 2003, now U.S. Pat. No. 7,185,463 and incorporated herein by reference in its entirety.

FIELD OF THE DISCLOSURE

The present disclosure relates generally to loading docks and, more particularly, to a sealing apparatus for deflecting runoff along an upper surface of a vehicle at the dock.

BACKGROUND OF RELATED ART

Trucks having open rear cargo bays are typically backed into alignment with a loading dock or other doorway of a building to facilitate loading or unloading of the truck's cargo. To protect the interiors of the building and the truck from the outside weather during loading and unloading, the space between the rear of the truck and the face of the building can be at least partially sealed off by installing either a loading dock shelter or a loading dock seal around the perimeter of the doorway Conventional loading dock seals comprise resilient, compressible pads that are attached to the building along the top and lateral edges of the doorway. The pad compliantly conforms to the rear contour of the truck as the truck presses up against the pad, thereby sealing the gap between the face of the building and the rear of the truck.

Dock shelters typically have rigid frame members, rather than compressible pads, installed along the top and lateral edges of the doorway. The frame members usually protrude one to three feet from the outside face of the building. To avoid being struck and damaged by a truck backing into the dock, the frame members are spaced farther away from the doorway than are the compressible pads of dock seals. Flexible side curtains attached to distal edges of the frame members lie generally parallel to the face of the building and extend into the anticipated path of the truck. As a truck backs into the dock, the side and head curtains sweep across the sides and top, back corner of the truck to provide sealing between the building and the rear of the truck.

Under most conditions, dock seals and dock shelters effectively seal out weather, but in certain situations additional protection is needed. If snow, for instance, accumulates on the top of the truck while the truck is parked at the dock, warm air from inside the building may warm the truck's cargo bay. This can begin melting the snow atop the truck, which can turn the snow to slush. The liquid nature of the slush can allow it to flow back toward the loading dock. Absent an effective top seal, slush or other liquid has the potential of spilling off the trailer and into the loading dock area. The problem is worse when a sloped driveway leans the truck toward the dock. A similar runoff problem may occur with heavy rain.

To address the runoff problem, U. S. Pat. Nos. 6,233,885 and 6,550,191 disclose a roller sealing apparatus that provides a flow deflector along the roof of the truck. The apparatus includes a cylindrical roller that rides up and over the top of the truck as the truck backs into the dock. To help protect the roller from the truck's impact, the rear edge of the truck lifts the roller into position by pushing against a stiffener (175), which in turn pushes against a ramp (180). The ramp forces the roller's support (120) to move the roller up and over the truck. When resting atop the truck's roof, the roller blocks any water flowing toward the back of the truck and redirects it to drain off to either side of the truck.

Unfortunately, such a roller sealing apparatus tends to be expensive as it has to be built sturdy enough to withstand relatively high forces generated by a departing truck that includes an upwardly protruding lip along the upper rear edge of the truck. High forces can develop as the protruding lip of the departing truck catches on some edge or surface of the sealing apparatus, such as the lower edge of the ramp. Other high forces can be caused by an exceptionally tall truck backing into the dock such that the truck's upper rear edge strikes the roller sealing apparatus near the pivot point of the roller's support. In some cases, the forces may tend to lift the sealing apparatus' entire supporting framework.

SUMMARY

In some examples, a runoff deflector includes a frame mountable to a building wall, a seal adapted to redirect water flowing across the top of a truck, a pliable curtain that suspends the seal from the frame, and a front bumper that helps protect the seal from vehicular impact and acts as a lever or lift to raise the seal on top of the In some examples, the seal is a cylindrical tube that rolls, and in other examples, the seal is cylindrical tube that does not roll.

In some examples, the pliable curtain that suspends the seal also wraps around the seal, acting as a cradle to help support the seal while it is at rest.

In some examples, a front bumper that helps protect and lift the seal comprises two panels that are movable relative to each other.

In some examples, a front bumper that helps protect and lift the seal comprises two panels, wherein one panel is more flexible than the other.

In some examples, a front bumper that helps protect and lift the seal comprises at least three panels that are each movable relative to the others.

In some examples, a front bumper that helps protect and lift the seal is stiffer in one direction more than another.

In some examples, a front bumper includes a curved distal edge that helps protect the deflector from being damaged by a departing vehicle.

In some examples, a runoff deflector includes a pivotal frame covered by a pliable sheet that supports the frame.

In some examples, a runoff deflector includes a back bumper that does not protrude any farther forward than the deflector's seal.

In some examples, a runoff deflector includes a front bumper and a back bumper, wherein the front bumper is more flexible than the back bumper.

BRIEF DESCRIPTION OF THE DRAWINGS

FIG. 3 is a side view of the deflector of FIG. 1.

FIG. 4 is a side view of the deflector of FIG. 2.

FIG. 5 is a side view of the deflector of FIG. 1 but showing how the deflector responds to a truck's departure.

FIG. 6 is a side view of the deflector of FIG. 5 but showing how the frame can yield to an exceptionally tall truck.

FIG. 7 is a side view similar to FIG. 3 but showing a different deflector.

FIG. 8 is a side view showing a truck pushing the deflector of FIG. 7 from its pendant position toward its operative position.

FIG. 9 is a side view similar to FIG. 4 but showing the deflector of FIG. 7.

FIG. 10 is a side view similar to FIG. 5 but showing the deflector of FIG. 7.

FIG. 14 is a side view similar to FIG. 3 but showing a different deflector.

FIG. 15 is a side view similar to FIG. 4 but showing the deflector of FIG. 14.

FIG. 16 is a side view similar to FIG. 5 but showing the deflector of FIG. 14.

DETAILED DESCRIPTION

Figure 1:
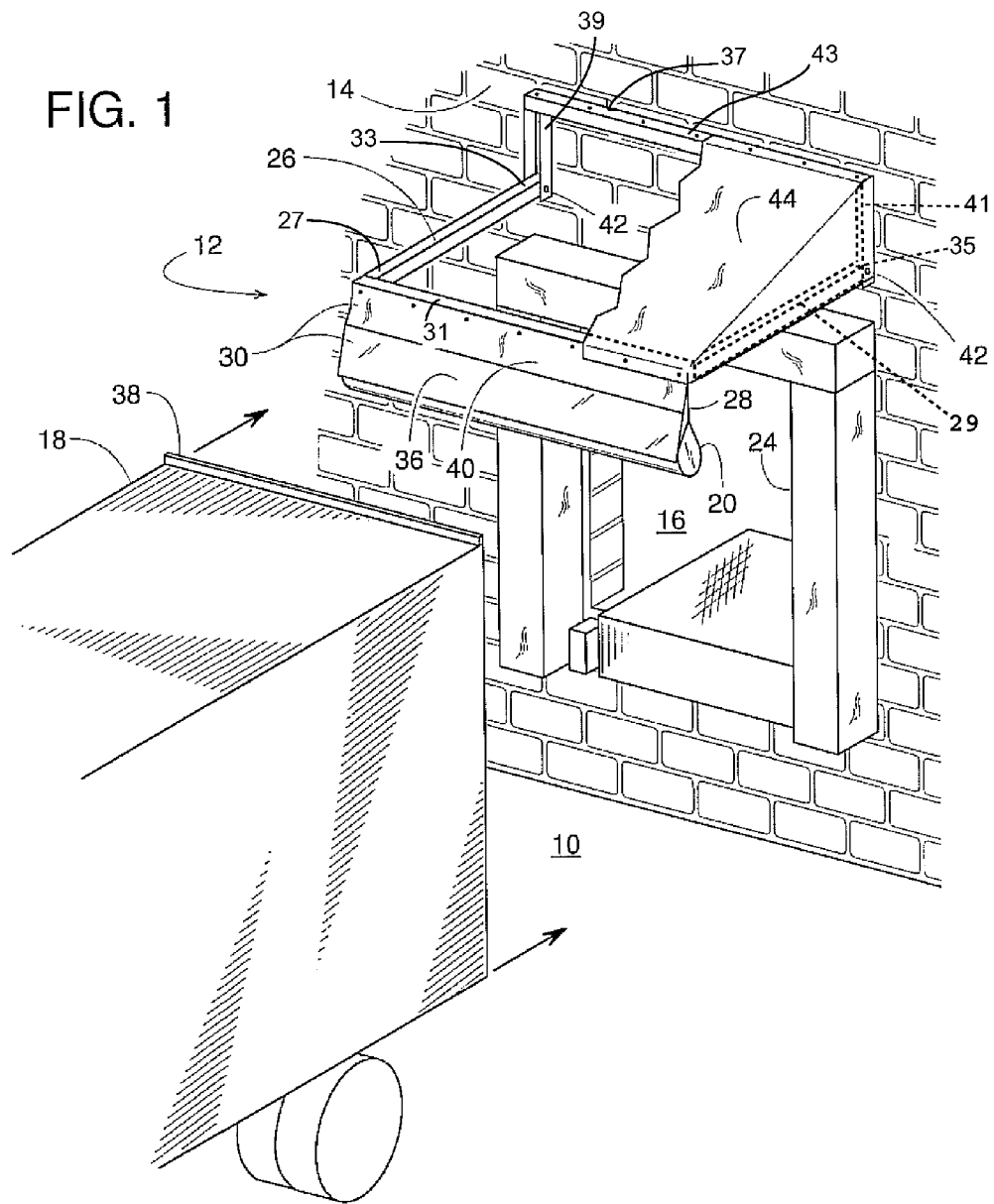
FIG. 1 is a perspective view of a water runoff deflector in a pendant position, wherein part of the deflector's frame covering is cutaway to show the frame.
Figure 2:
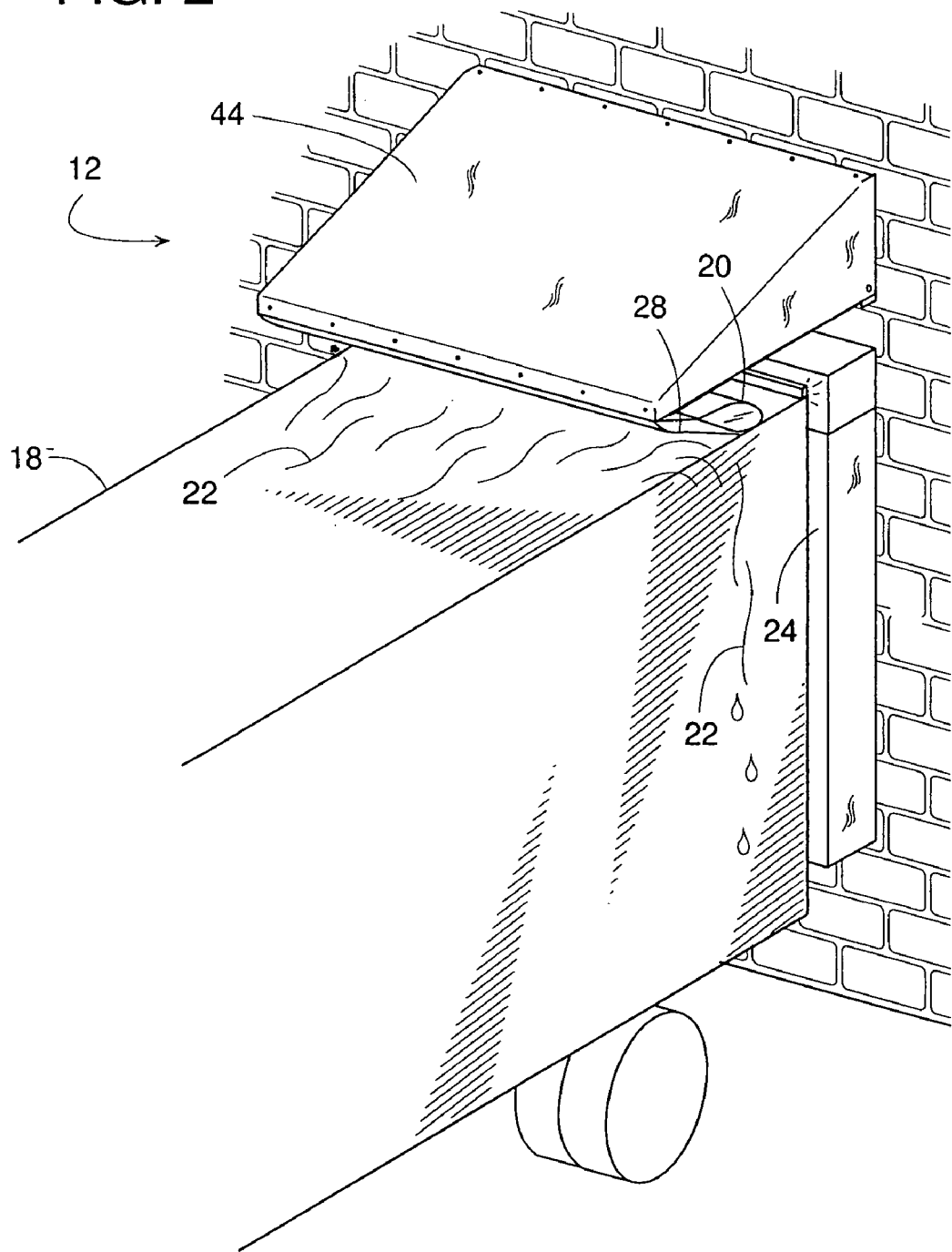
FIG. 2 is a perspective view of the runoff deflector of FIG. 1 but shown in an operative position.

FIGS. 1-5 show a loading dock 10 that includes a water runoff deflector 12 mounted to a building wall 14 above a doorway 16. A truck 18, trailer, or other vehicle can back underneath deflector 12 so that a seal 20 of the deflector rests atop the truck's roof. Seal 20 helps prevent water 22 (snow, rain, ice, slush, etc.) on the truck's roof from flowing off the back end of the truck and spilling into the building. Seal 20 helps block any water 22 flowing along the truck's roof toward doorway 16 and redirects the flow off to either side of the truck. Although deflector 12 is shown being used with a dock seal 24, deflector 12 could instead be used with a dock shelter or could be used alone without either a dock seal or a dock shelter.

In some examples, deflector 12 comprises frame 26, seal 20, a hanger 28 that suspends seal 20 from frame 26, and a front bumper 30 that helps protect seal 20 from the impact of truck 18. In response to truck 18 entering or leaving dock 10, deflector 12 may move to a pendant position (FIGS. 1 and 3), an operative position (FIGS. 2 and 4), or various departing positions (FIG. 5). In this example, as shown in FIG. 1, the frame 26 is a U-shaped member that includes a first arm 27 parallel to, and spaced from, a second arm 29. The first arm 27 and the second arm 29 are pivotally mounted to the wall 14. The frame 26 also includes a third arm 31 coupled to the first arm 27 and the second arm 29 to span the space therebetween.

In this example, as most clearly shown in FIG. 1, an end 33 of the first arm 27 and an end 35 of the second arm 29 are pivotally mounted to the wall 14 via a bracket 37. The bracket 37 includes a first member 39, a second member 41, and a third member 43 to span the distance between the first and second members 39 and 41. The first arm 27 is pivotally coupled to the first member 39 of the bracket 37 and the second arm 29 is pivotally coupled to the second member 41 of the bracket 37 at pivot points 42. As shown, pivot points 42 are at a distance from the third member 39.

Before truck 18 enters dock 10, seal 20 of deflector 12 hangs in a pendant position as shown in FIGS. 1 and 3. In this position, seal 20 hangs directly underneath a pivotal axis 32 about which seal 20 and hanger 28 can rotate.

As truck 18 backs underneath deflector 12, an upper rear edge of truck 18 engages front bumper 30 and forces bumper 30 and seal 20 to pivot upward and toward wall 14 until seal 20 rests atop the truck's roof as shown in FIG. 4. In this position, seal 20 creates a dam or an obstruction to water 22 tending to flow back toward wall 14. Instead of flowing off the back end of truck 18, the water is now redirected to flow off to either side of truck 18.

The construction of seal 20 may vary, but in some cases, seal 20 comprises a cylindrical foam pad encased within a pliable covering. A portion of the covering may extend upward from seal 20 to axis 32, whereby hanger 28 is made of a pliable panel 34. Panel 34 and the covering around seal 20 may be any of a variety of materials including, but not limited to, HYPALON, canvas duck, rubber-impregnated fabric, and coated nylon or polyester fabric. The simplified design provides seal 20 and hanger 28 with significant flexibility, even though the construction inhibits seal 20 from continually rotating about itself.

Front bumper 30 may include a lower panel 36 that is stiffer than the material of hanger 28 and the covering of seal 20 so that panel 36 can effectively lift seal 20 onto the top of truck 18. Panel 36 can be made of a variety of materials including, but not limited to, polyethylene, polypropylene, etc. When truck 18 departs, high forces between panel 36 and the rear edge of truck 18 (which forces may be increased by the presence of upwardly protruding lip 38) can be avoided by having a more flexible upper panel 40 (e.g., HYPALON, canvas duck, rubber-impregnated fabric, coated nylon or polyester fabric, etc.) suspend lower panel 36 from frame 26.

FIG. 5, for instance, shows lower panel 36 being caught by lip 38 as truck 18 pulls away from the dock. The greater flexibility of upper panel 40, however, allows bumper 30 to readily yield without damage as truck 18 continues to move forward away from wall 14. After the truck leaves, deflector 12 can return to its original pendant position of FIG. 1.

If an exceptionally tall truck 18' pulls out from underneath deflector 12, as shown in FIG. 6, frame 26 can yield with upward pivotal motion about points 42. In this case, frame 26 includes a pliable sheet 44 (e.g., HYPALON, canvas duck, rubber-impregnated fabric, coated nylon or polyester fabric, etc.) or some other flexible member (e.g., a cable, chain, strap, etc.) whose tension limits the downward pivotal movement of the frame. Thus, frame 26 can yield by pivoting upward, but the tension in sheet 44 helps prevent the frame from drooping. Indeed, sheet 44 serves in some sense as a structural member in the depicted example, since the load of the frame and the suspended seal 20 and bumper 30 is borne by sheet 44. Using the tensile strength of sheet 44 in this manner yields a desirable frame design that minimizes the need for structural metal while providing enhanced functionality and aesthetics as compared to conventional designs. Moreover, sheet 44 serves the additional function of creating a canopy/awning/hood over the top seal assembly.

In some examples, as shown in FIGS. 7, 8, 9 and 10 (FIGS. 7, 9 and 10 correspond to FIGS. 3, 4 and 5 respectively), a deflector 46 includes a front bumper 48 that comprises a plurality of interconnected panels 50, 52 and 54. Individually the panels are relatively stiff, but are pivotally interconnected so that bumper 48 yields more readily in one direction than another. This creates a bumper that acts relatively stiff as truck 18 backs into the dock (FIG. 8), whereby the stiffness helps in lifting seal 20 atop of truck 18. Yet, bumper 48 is more yieldable to reduce forces between lip 38 and bumper 48 as the truck departs (FIG. 10). The bumper's variation in yieldability can be achieved by having a pivotal joint 56 of adjoining panels be at an intermediate position between the upper and lower edges of a given panel.

Figure 11:
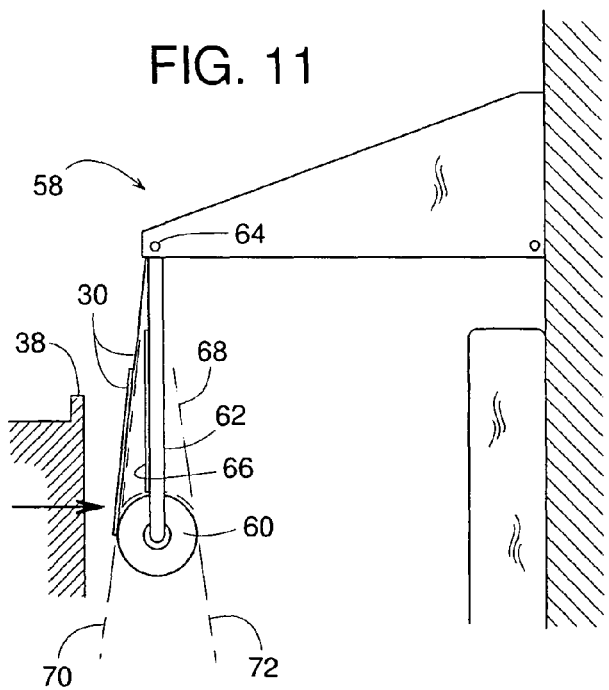
FIG. 11 is a side view similar to FIG. 3 but showing a different deflector.
Figure 12:
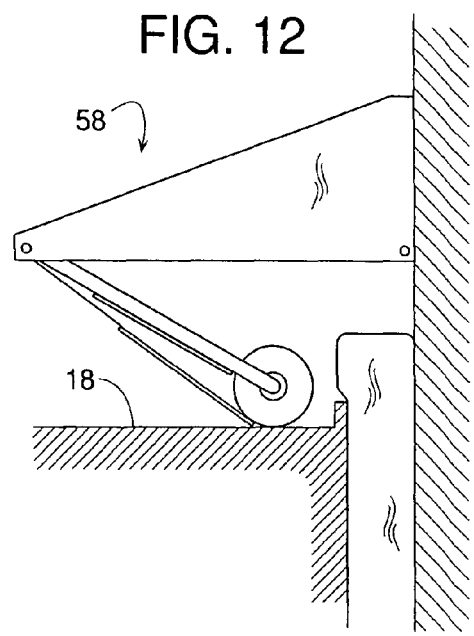
FIG. 12 is a side view similar to FIG. 4 but showing the deflector of FIG. 11.
Figure 13:
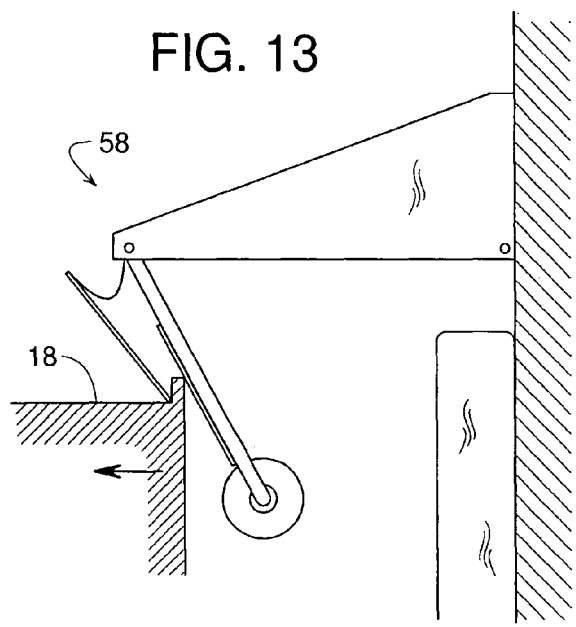
FIG. 13 is a side view similar to FIG. 5 but showing the deflector of FIG. 11.

In another example, shown in FIGS. 11, 12 and 13 (which correspond to FIGS. 3, 4 and 5 respectively), a deflector 58 includes a rotatable seal 60 suspended from a rigid hanger 62 that can pivot about an upper axis 64. A back bumper 66, in the form of a generally rigid plate, is attached to hanger 62 to help provide front bumper 30 with some back support and to help prevent lip 38 from catching on any edges of hanger 58 as truck 18 departs. In one example, seal 60 extends in front of back bumper 66. In some cases, back bumper 66 is fully contained within a region 68 defined by two converging imaginary planes 70 and 72 that lie tangent to the peripheral surface of seal 60 and intersect axis 64. With back bumper 66 in such a receded position, the back bumper does not have to be as sturdy since front bumper 30 and seal 60 absorb much of the truck's impact.

FIGS. 14, 15 and 16 show a deflector 74 that is very similar to deflector 58 except a back bumper 76 replaces back bumper 66. Back bumper 76 is a curved rigid plate that includes a curved distal edge 78. The curvature of edge 78 makes it especially unlikely for lip 38 of a departing truck to adversely catch on anything of deflector 74.

Figure 17:
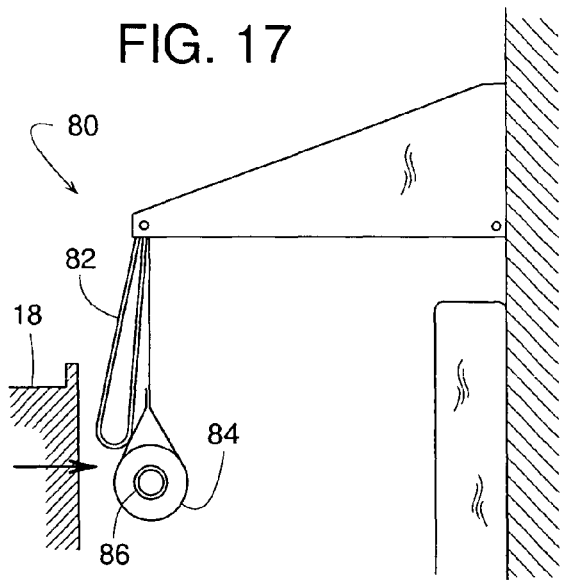
FIG. 17 is a side view similar to FIG. 3 but showing a different deflector.
Figure 18:
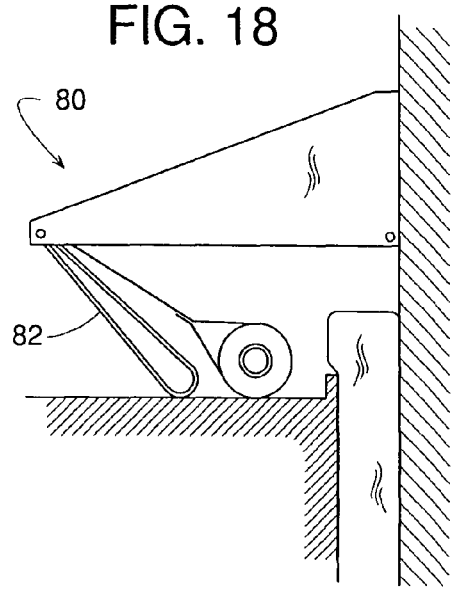
FIG. 18 is a side view similar to FIG. 4 but showing the deflector of FIG. 17.
Figure 19:
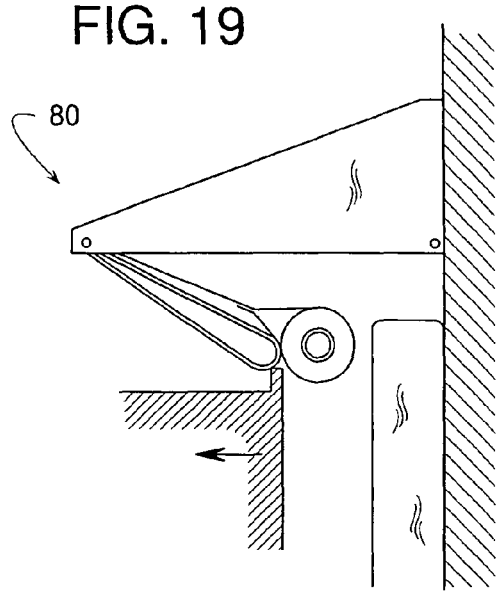
FIG. 19 is a side view similar to FIG. 5 but showing the deflector of FIG. 17.
Figure 20:
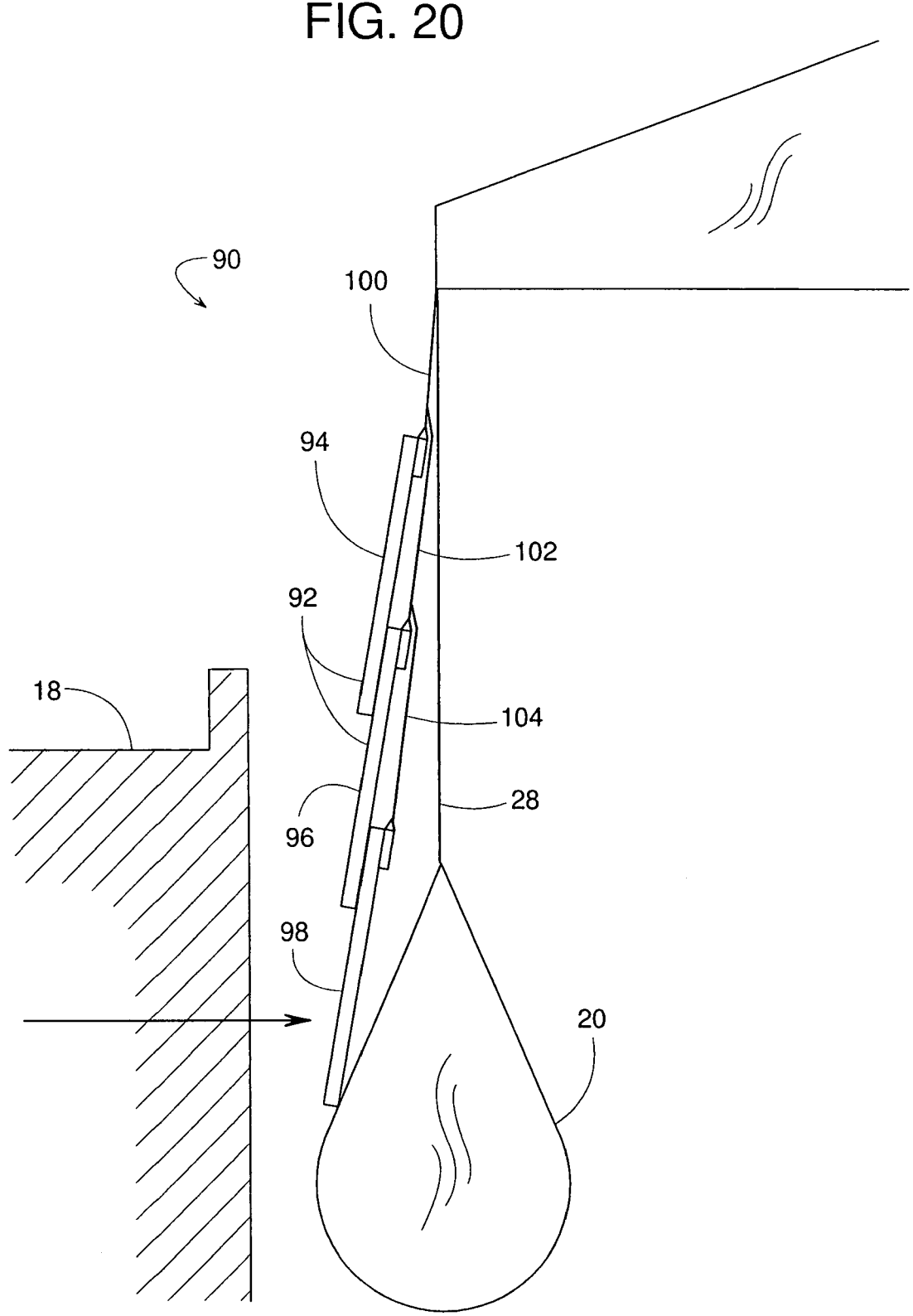
FIG. 20 is a side view of another deflector.
Figure 21:
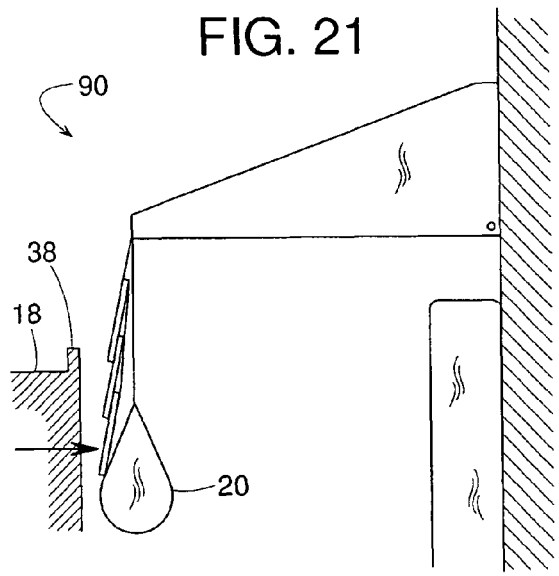
FIG. 21 is a side view similar to FIG. 7 but showing the deflector of FIG. 20.
Figure 22:
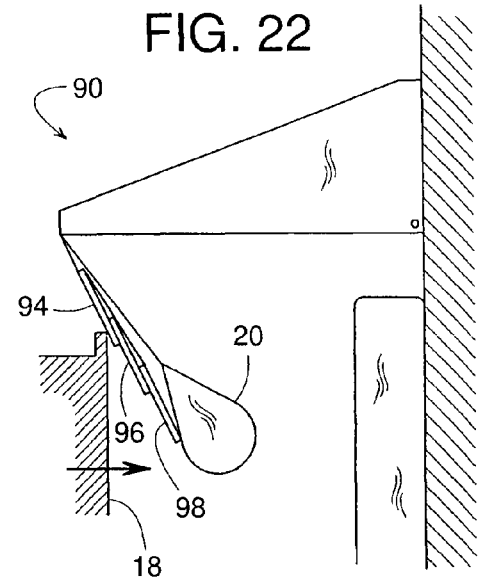
FIG. 22 is a side view similar to FIG. 8 but showing the deflector of FIG. 20.
Figure 23:
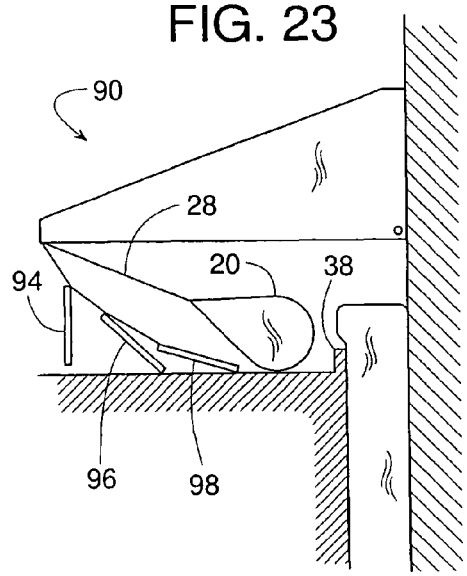
FIG. 23 is a side view similar to FIG. 9 but showing the deflector of FIG. 20.

Another deflector 80, shown in FIGS. 17, 18 and 19, includes a front bumper 82 whose structure is very similar to that of back bumper 76 of deflector 74. A seal 84 of deflector 80 includes an internal metal pipe 86 for added weight, which increases the sealing force that seal 84 applies to the roof of truck 18.

Figure 24:
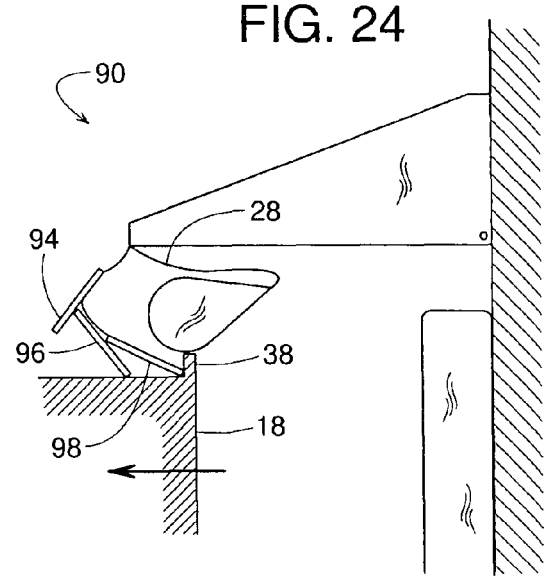
FIG. 24 is a side view similar to FIG. 10 but showing the deflector of FIG. 20.

In another example, as shown in FIGS. 20-24 (FIGS. 21, 22, 23 and 24 correspond to FIGS. 7, 8, 9 and 10 respectively), a deflector 90 includes a front bumper 92 that comprises a plurality of interconnected panels 94, 96 and 98. Individually the panels are relatively stiff, but are pivotally interconnected so that bumper 92 yields more readily in one direction than another. This creates a bumper that acts relatively stiff as truck 18 backs into the dock (FIG. 22), whereby the stiffness helps in lifting seal 20 atop of truck 18. Yet, bumper 92 is more yieldable to reduce forces between lip 38 and bumper 92 as the truck departs (FIG. 24). In this case, the bumper's variation in yieldability is achieved by having panels 94, 96 and 98 be interconnected by a plurality of flexible panels 100, 102 and 104.

Although the invention is described with reference to various examples, it should be appreciated by those skilled in the art that various modifications are well within the scope of the invention. Therefore, the scope of the invention is to be determined by reference to the claims that follow.

The invention claimed is:

1. A deflector for deflecting runoff on an upper surface of a vehicle parked at a loading dock that is adjacent a wall of a building, the deflector comprising:

a bracket to be coupled to the wall;

a frame having a first end and a second end, the first end to be pivotally coupled to the bracket at a pivot point;

a flexible cover having a length to suspend the frame in a first position substantially horizontal to and projecting away from the wall and to limit downward rotation of the frame below the first position, the flexible cover being taut when the frame is in the first position and and aides in preventing the frame from moving below the first position, the flexible cover having a first end to be attached to the wall or the bracket at a first elevation above the pivot point and a second end coupled to the second end of the frame at a second elevation, the second elevation being above the pivot point and lower than the first elevation such that an upper surface of the flexible cover between the first end and the second end is at a downward inclination away from the wall to prevent accumulation of debris or elements on the upper surface when the frame is in the first position, the flexible cover to collapse to allow the frame to pivot upward toward the wall in response to movement of the vehicle;

a suspension member depending from the second end of the frame; and a seal suspended from the suspension member such that the seal is movable to engage the upper surface of the vehicle.

2. The deflector of claim 1, wherein the frame comprises a first arm to be coupled to the wall at a first pivot point and a second arm adjacent the first arm to be pivotally mounted to the wall at a second pivot point.

3. The deflector of claim 2, wherein the flexible member is coupled to the first arm and the second arm such that the flexible member maintains the first and second arms in the first position above a height of the vehicle but allows the first and second arms to pivot toward the wall to an inclined operative position in response to movement of the vehicle.

4. The deflector of claim 2, wherein the frame further comprises a cross-member attached to the first arm and the second arm.

5. A deflector of claim 2, wherein the bracket includes a first member adjacent a second member and a third member disposed therebetween, wherein the first member pivotally receives the first arm at the first pivot point and the second member pivotally receives the second arm at the second pivot point, wherein the first and second pivot points are spaced a distance from the third member.

6. A deflector of claim 5, wherein the flexible member is coupled to the third member of the bracket.

7. The deflector of claim 1, further comprising a bumper in front of the seal to help protect the seal from vehicular impact and to help lift the seal onto the vehicle.

8. The deflector of claim 7, wherein the bumper comprises a first panel and a second panel that are movable relative to each other.

9. A deflector of claim 1, wherein the seal comprises a cylindrical foam pad encased within a pliable covering.

10. A deflector of claim 1, wherein the angle of the upper surface of the flexible cover is sloped downwardly toward earth when the frame is in the first position.

11. A deflector of claim 1, wherein the frame is at a first angle relative to the wall and an upper surface of the frame when the frame is in the first position, and wherein the frame is at a second angle relative to the wall and the upper surface of the frame that is less than the first angle in response to the vehicle engaging the deflector.

12. A deflector for deflecting runoff on an upper surface of a vehicle parked at a loading dock that is adjacent a building wall, the deflector comprising:
- a bracket to be coupled to the building wall and having a first member spaced from a second member and a third member disposed between the first and second members;
- a first arm having a first end pivotally coupled to the first member of the bracket at a first pivot point;
- a second arm having a second end pivotally coupled to the second member of the bracket at a second pivot point, wherein the second arm is substantially parallel to and spaced apart from the first arm;
- a third arm coupled to the first and second arms to span the space therebetween;
- a flexible member having a first portion coupled to the third member of the bracket above the first and second pivot points and a second portion coupled to at least one of the first, second, or third arms such that the flexible member maintains the first, second, and third arms in a substantially horizontal rest position in a plane substantially perpendicular relative to the building wall when the flexible member is in a substantially taut condition, the flexible member aiding in the prevention of the first, second and third arms from pivoting below the plane and, the flexible member collapses to allow the first, second, and third arms to pivot toward the third member of the bracket; and
- a seal suspended below the third arm, the seal movable to engage the upper surface of the vehicle.

13. The deflector of claim 12, further comprising a bumper in front of the seal to help protect the seal from vehicular impact and to help lift the seal onto the vehicle.

14. The deflector of claim 13, wherein the bumper comprises a first panel and a second panel that are movable relative to each other.

* * * * *